(No Model.)
C. LAVAL.
METHOD OF SILVERING GLASS FOR MANUFACTURE OF MIRRORS.
No. 368,839. Patented Aug. 23, 1887.
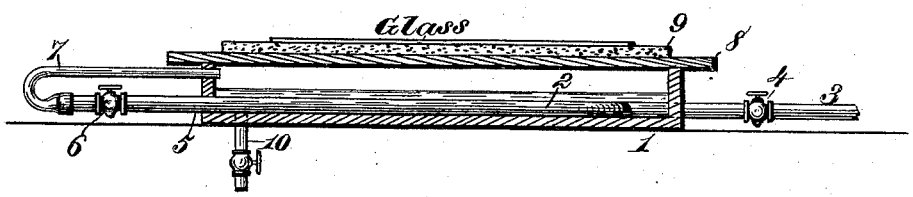
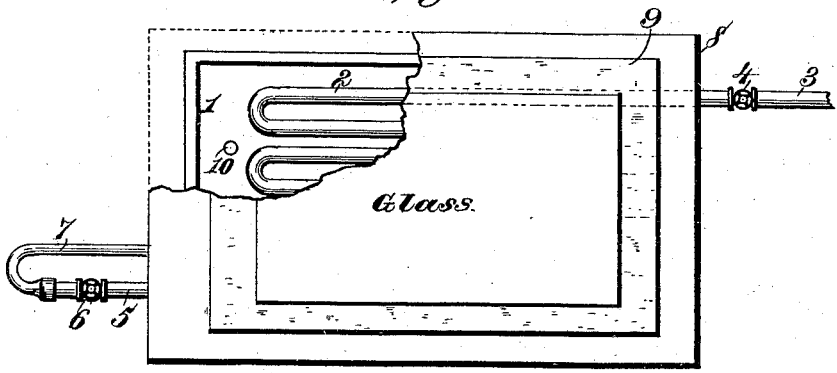
Witnesses.
Robert Pruett,
Percy B. Hills.
Inventor.
Constant Laval,
By James L. Norris.
Atty.

UNITED STATES PATENT OFFICE.

CONSTANT LAVAL, OF KANSAS CITY, MISSOURI.

METHOD OF SILVERING GLASS FOR MANUFACTURE OF MIRRORS.

SPECIFICATION forming part of Letters Patent No. 368,839, dated August 23, 1887.

Application filed April 25, 1887. Serial No. 236,071. (No model.)

*To all whom it may concern:*

Be it known that I, CONSTANT LAVAL, a citizen of the United States, residing at Kansas City, in the county of Jackson and State of Missouri, have invented new and useful Improvements in the Method of Silvering Glass for Manufacture of Mirrors, of which the following is a specification.

My invention relates to methods of silvering glass for the manufacture of mirrors and similar purposes.

It is the purpose of my invention to provide a novel process for depositing the metal, whereby a considerable economy of expenditure is secured, and at the same time the products obtained are very superior in quality to those heretofore produced, the metal backing having great brilliancy and firm contact or adhesion, while it is free from all impurities, is air-tight, and well protected from dampness, heat, or atmospheric changes, as well as the attacks of insects.

It is also a purpose of my invention to provide a method of procedure whereby the deposition of the metal and the subsequent drying and removal of particles of foreign matter are effected without the necessity of handling or moving the glass, whereby a better quality of work is secured and the danger of soiling the glass by finger-marks is wholly avoided.

My invention consists, to these ends, in a novel process of treatment, hereinafter fully set forth and claimed.

In the accompanying drawings, showing one form of apparatus for practicing my invention, Figure 1 is a vertical section showing such apparatus. Fig. 2 is a broken plan view of the parts shown in Fig. 1.

In the said drawings, the reference-numeral 1 denotes a tank of any suitable dimensions—say one hundred and fifty inches in length by seventy-six inches in width. This tank may be made of galvanized iron or of wood, and it should have steam-tight joints. It is of comparatively shallow depth, and within said tank is a coil of steam-pipes, 2, connected with any suitable steam-supply by the extension 3, which is provided with a valve, 4, to govern the inlet of steam to the coil. The other end of the coil extends through the pan or tank, as at 5, and is provided with a flexible pipe or hose, 6, passed into the upper part of the tank to deliver the live steam thereinto. The extension 5 is provided with a valve, 7, to control the passage of steam through the hose to the tank. The tank is partially filled with water—say to a depth of four to six inches—and such water is heated by the coil and by the steam entering through the hose. The top of the pan or tank is closed by a plate, 8, of metal, slate, marble, or other substance which is a good conductor of heat, and the whole is carefully leveled until the surface of the plate is in a true horizontal plane. Upon the surface of the plate 8 one or more blankets, 9, are laid, which blankets are made of suitable absorbent material, such as felt, and the blankets are supplied with water to keep them constantly moistened.

The apparatus being thus organized, I prepare the silvering solutions as follows: Two hundred grams of nitrate of silver are dissolved in forty-eight ounces of distilled water, together with four or five ounces of concentrated ammonia. I then dissolve four hundred grams of sel de Seignette in forty-eight ounces of distilled water, to which is added from five to twenty grams of citric acid previously dissolved in distilled water. These two solutions, being separately filtered and bottled, are ready for use.

The glass to be silvered is carefully cleaned and polished with rouge-powder and felt or tin-powder. The glass is then placed on an inclined washing-table and thoroughly cleansed, rinsing it finally with distilled water. The glass is then laid upon the blanket or blankets 6. I then take of distilled water thirty-two ounces, and add thereto one ounce of each of the solutions above described, and the fluid compound is then poured carefully upon the surface of the glass, the perfectly level position of the latter enabling it to retain a considerable quantity. The steam-valve 4 is then opened and live steam is allowed to flow into the tank 1 through the coil and hose, as before explained. The increased temperature thus produced acts upon the lower side or face of the glass, which lies upon the blanket 9, causing a precipitation of the metal, or, in other words, drawing the silver deposit down upon the glass, to which it firmly adheres. As soon as this part of the process is completed the silver backing is dried by means of a chamois-skin, and brown shellac dissolved in ninety-five per cent. alcohol is applied to the dried plate while the same is still heated. This quickly evaporates the alcohol, leaving the hardened shellac, and I then take about two pounds of silver-white ground in japan and mixed with turpentine and asphaltum varnish, the whole being thoroughly mixed. This gives a fine smooth coating to the silvered back and totally excludes air. While this coating is still fresh or green I take silver-lining bronze-powder and deposit the same on the plate, making a perfect metal back and re-enforcing the silver-white, japan, and asphalt. Cremnitz white can also be used for the same purpose with like results. By observing the substantial proportions given a beautiful metal back is produced proof against all atmospheric variations, such as cold, heat, and dampness. I also produce a most brilliant and powerful reflection and secure a perfect and strong adhesion of the metal back to the glass. The coating, also, is perfectly uniform, owing to the ability to regulate the heat under the glass, and it is from this cause, also, that I obtain a much better deposition of the silver than is possible by any process wherein the glass is treated in a chamber where it is exposed to heat upon both sides. It has been found that in such practice the silver will float upon the surface of the solution without precipitation, whereas by applying the heat to the under side of the glass only the silver is drawn down thereon and a perfect deposition obtained. Moreover, when the silver deposition has proceeded far enough the remainder of the solution may be drained off and preserved. Again, by my method the whole process may be conducted without handling and moving the glass. Heretofore in silvering by previous processes it has been impossible to obtain such perfect adhesion as to permit the backing to be rubbed with the chamois-skin, and therefore it was necessary to take the glass up and place it on a drying-rack, thereby incurring the risk of making finger-marks on the glass while still wet.

I do not here claim the apparatus shown and described, as it constitutes the subject-matter of a separate application for Letters Patent.

What I claim is—

1. In silvering glass, the process herein described, consisting in placing the glass upon a level slab or plate having an interposed absorbent sheet, pouring the silvering solution upon the surface of the glass, and then heating the slab, whereby the heat is applied to the lower surface of the glass, substantially as described.

2. In silvering glass, the process herein described, consisting in laying the glass upon the level top of a closed tank, with an absorbent sheet interposed, pouring the silvering solution upon the surface of the glass, and injecting live steam into the tank until the glass acquires the proper degree of heat, substantially as described.

3. The process set forth for silvering glass, consisting in applying the silvering solution to one side of the glass, applying heat to the other side, drying the deposited metal, applying brown shellac dissolved in alcohol while the glass is still hot, then applying silver-white ground in japan and mixed with turpentine and asphaltum varnish, and while the latter coating is still fresh applying silver-lining bronze-powder, substantially as described.

In testimony whereof I affix my signature in presence of two witnesses.

CONSTANT LAVAL.

Witnesses:
C. CLAUDE,
L. C. FERREE.